R. F. DISERENS.
WET SEPARATOR FOR DUST REMOVING APPARATUS.
APPLICATION FILED MAY 14, 1907.
942,891.
Patented Dec. 14, 1909.
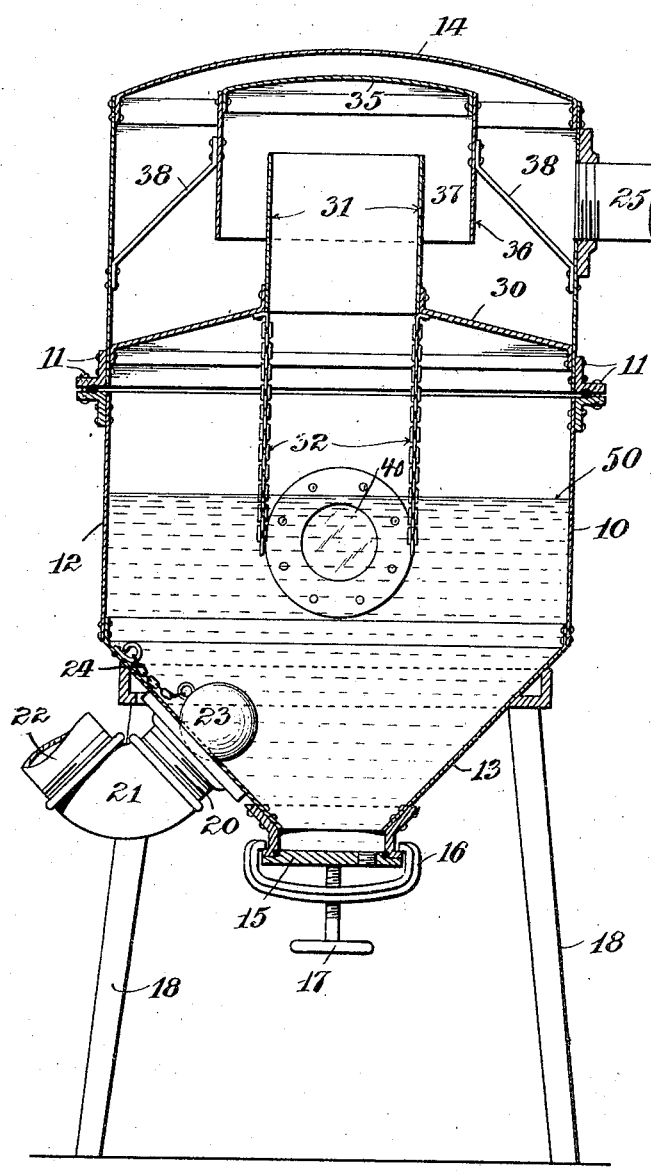
Attest:
Inventor:
Ralph F. Diserens
by William R. Baird,
his Atty.

UNITED STATES PATENT OFFICE.

RALPH F. DISERENS, OF BRADFORD, PENNSYLVANIA, ASSIGNOR TO THE BLAISDELL MACHINERY COMPANY, OF BRADFORD, PENNSYLVANIA, A CORPORATION OF PENNSYLVANIA.

WET SEPARATOR FOR DUST-REMOVING APPARATUS.

942,891.

Specification of Letters Patent. Patented Dec. 14, 1909.

Application filed May 14, 1907. Serial No. 373,548.

*To all whom it may concern:*

Be it known that I, RALPH F. DISERENS, a citizen of the United States, residing at Bradford, in the county of McKean and State of Pennsylvania, have invented certain new and useful Improvements in Wet Separators for Dust-Removing Apparatus, of which the following is a specification.

My invention relates to a dust removing apparatus and more particularly to that kind of an apparatus comprising a nozzle having a dust collecting inlet slot and means, as a suction pump, for creating a partial vacuum back of the inlet of the nozzle for the purpose of removing the dust laden air from the surface over which the nozzle is moved.

In such an apparatus it is convenient to place a dust collector between the nozzle and the suction apparatus in order that the latter may not be clogged up by the collected dust, and my invention relates to a novel and efficient form of dust collector. Dust collectors for this purpose are of two kinds: dry collectors in which the dust laden air is introduced, and which is provided with means for permitting the passage of the air, but retaining the whole or greater part of the dust, and wet collectors provided with a liquid chamber and means whereby a current of dust laden air is introduced below the surface of the liquid level and passing through the liquid is washed or deprived of its dust burden, and is delivered at the outlet and toward the suction pump practically free from impurities.

My invention relates to collectors of the latter class and it may be used either with or without a dry collector as may be most convenient.

In the drawing, there is shown a form of dust collector embodying my invention in central vertical section, some of the parts being shown in elevation.

In the drawing, 10 is a casing preferably made in three parts, secured together by bolts 11, or in any other suitable manner. These parts comprise a central cylinder 12, a conical bottom 13 and an imperforate cover 14.

The bottom is provided with means for tightly closing it, comprising a plate 15, an encircling strip 16, and a screw handle 17. This means of closure is of usual form and needs no special description. The casing is supported on legs 18 or other suitable form of support, so that it may be elevated above the surface of the ground.

The conical bottom 13 is provided at a suitable point with an aperture outside of which is secured a branch pipe 20 to which in turn is secured a fitting 21 and beyond it an air inlet pipe 22 connected, either directly to the dust collecting nozzle (not shown), or to the air oulet of a dry separator (not shown). If desired, a float valve 23 of usual construction and secured to the side of the apparatus by a chain 24, or other suitable means, is provided automatically to close the air inlet against the backward flow of the water within the apparatus.

At the upper portion of the casing 12 and preferably near the top 14 is a suitable aperture to which is secured an air outlet pipe 25 of any suitable form and construction and secured to the casing by any suitable means, as for instance, a fastening ring 26.

Slightly above the central medial line of the apparatus there is arranged a transverse baffle plate 30 centrally apertured and provided with an upwardly extending pipe 31 open at its top. Depending from suitable points on this baffle plate are chains 32 reaching down below the usual water level and the purpose of which is to prevent the formation of large bubbles of dust laden air at such level. It is presumed that these chains exercise their peculiar effect of preventing the formation of bubbles at or near the water level, partly, at least, by reason of the irregular character of their surfaces. Moreover, being, in the form herein shown, suspended in a manner which permits them to swing under the effects of the air currents set up within the separator, they will by such movement further act to bring up the bubbles.

Arranged intermediate the pipe 31 and the cover 14 is a deflector 35 in the form of an inverted cup, the top of which is imperforate and the sides 36 of which depend downward so as to surround the pipe 31 leaving between the outside of the pipe and the inside of the deflector an annular space 37. The deflector is suitably supported from the inside of the casing by rods 38, 38, secured to the casing and the deflector by bolts or in any other suitable manner.

The top of the pipe 31 is preferably on a level with the upper part of the outlet pipe 25, and the bottom edge of the deflector 35 is preferably on a level with the lower part of the outlet pipe 25.

The manner of using the device is as follows:—The parts being assembled in the manner shown in the drawing a suction is created in the outlet pipe 25 and this being communicated to the interior of the casing 10 a partial vacuum is formed therein. It will, of course, be understood that the device is previously filled with water up to a point indicated at 50 or thereabout. The suction being maintained within the interior of the apparatus, the ball valve 23 is finally lifted from its seat against the pressure of the water thereon due to the gravity of the latter and the dust laden air begins to flow from the pipe 22 through the elbow fitting 21 and pipe 20 into the apparatus beneath the water level. As the air passes through the mass of water it breaks up into little currents and parts with its dust which remains in the water. Sometimes under the effect of the outward flowing current large bubbles form in the water and are carried over into the outlet pipe 25. This is undesirable, because these bubbles usually carry dust with them and tend to choke up the apparatus. In order to prevent this, I provide the baffle plate 30 against which these bubbles will tend to splash and be deflected and broken up in the process, and I provide it with a restricted aperture leading to the pipe 31 in order that the current of air may be restricted at that point. This increases the relative rapidity of movement of the air through the pipe 31 and causes the air carrying particles of water with it to dash against the lower side of the deflector 35 and to fall back into the mass of water, parting with most of its water in the form of spray. The current of air deprived thus of its dust and water passes downward over the edge of the pipe 31 into the annular space 37, and thence upward again to reach the entrance to the outlet pipe 25 whence it moves onward to the suction pump.

In practice I have found this device quite efficient and the obstacles placed in the path of the current of air to be such as will effectually remove the dust and water therefrom before its exit from the apparatus.

If, for any reason, the suction ceases to exert an influence upon the air in the apparatus above the water level, the valve 23 is automatically closed by the weight of the water and the latter either does not enter the pipe 20 or does so in such minute quantities that it may be disregarded. A transparent window or peephole 40 may be formed in the side of the apparatus for the purpose of observing whether the dust has collected therein in any large quantities and if such is ascertained to be the case the operation of the device is stopped and the plate 15 is removed to permit of the discharge from the apparatus of the impurities which have collected therein.

What I claim as new is:—

1. A separator for dust removing apparatus comprising a casing forming a water receptacle in the lower part thereof, an air inlet below the water level, an air outlet above the water level, and an apertured baffle disk arranged intermediate the air inlet and outlet and above the water receptacle, said baffle disk being provided with an annular flange surrounding its aperture and extending upwardly above the level of the air outlet.

2. A separator for a dust removing apparatus, comprising a casing having a water receptacle in the lower part thereof, an air inlet below the water level and a chain extending to a point below the water level and adapted to prevent the formation of large bubbles at or near the water level.

3. A separator for a dust removing apparatus, comprising a casing having a water chamber in the lower part thereof, an air inlet below the water level, an air outlet above the water level, an apertured baffle disk intermediate the air inlet and outlet, and means adapted to prevent the formation of large bubbles at or near the water level, consisting of chains reaching from above to a point below the water level.

4. A separator for a dust removing apparatus, comprising a casing having a water receptacle in the lower part thereof an air inlet below the water level, and means suspended from a point above the water level and adapted to swing loosely to a point below the surface of the water to prevent formation of bubbles at or near the water level.

5. A separator for a dust removing apparatus, comprising a casing having a water receptacle in the lower part thereof, an air inlet below the water level, and means adapted to prevent formation of large bubbles at or near the surface of the water, said means including members with an irregular outer surface suspended above the water level and adapted to swing loosely to a point below the surface of the water.

6. A separator for dust removing apparatus, comprising a casing having a water receptacle in the lower part thereof, an air inlet below the water level, and means adapted to prevent the formation of large bubbles at or near the surface of the water, said means including chains suspended above the water level and adapted to swing loosely to a point below the surface of the water.

7. A separator for a dust removing apparatus, comprising a casing having a water receptacle, an air inlet to said receptacle, an air outlet, a baffle plate between the inlet and outlet, said baffle plate having an aperture, a hood arranged over said aperture, and means extending from the baffle plate and into the water for preventing the formation of bubbles at or near the water level.

8. A separator for a dust removing apparatus, comprising a casing having a water receptacle, an air inlet to said receptacle, an air outlet, a baffle plate between the inlet and outlet, said baffle plate having an aperture, a pipe extending from said aperture, a hood arranged over the pipe and means extending from the baffle plate and into the water for preventing the formation of bubbles at or near the water level.

In testimony whereof I affix my signature in presence of two witnesses.

RALPH F. DISERENS.

Witnesses:
   GILES E. McCLEERY,
   CHAS. C. McCAFFERTY.